(12) United States Patent
Shateri et al.

(10) Patent No.: US 11,860,854 B2
(45) Date of Patent: *Jan. 2, 2024

(54) ANOMALY DETECTION IN RELATIONAL DATABASES

(71) Applicant: Cigna Intellectual Property, Inc., Wilmington, DE (US)

(72) Inventors: Mahsa Shateri, Los Angeles, CA (US); Steven Conforti, West Hartford, CT (US)

(73) Assignee: Cigna Intellectual Property, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/962,955

(22) Filed: Oct. 10, 2022

(65) Prior Publication Data

US 2023/0031594 A1 Feb. 2, 2023

Related U.S. Application Data

(63) Continuation of application No. 17/121,827, filed on Dec. 15, 2020, now Pat. No. 11,468,041.

(51) Int. Cl.
*G06F 16/00* (2019.01)
*G06F 16/23* (2019.01)
*G06F 16/28* (2019.01)

(52) U.S. Cl.
CPC ........ *G06F 16/2365* (2019.01); *G06F 16/285* (2019.01)

(58) Field of Classification Search
CPC ...... G06F 2119/12; G06F 30/39; G06F 30/20; G06F 30/398; G06F 2111/10; G06F 2119/18; G06F 2111/08; G06F 2119/22; G06F 3/04815; G06F 3/04847; G06F 30/30; G06F 11/008; G06F 11/0715; G06F 11/0718; G06F 11/0751; G06F 11/0778; G06F 11/079; G06F 11/3003; G06F 11/3037; G06F 11/34; G06F 11/3409; G06F 11/3419; G06F 11/3452; G06F 11/3471; G06F 16/1824; G06F 16/21; G06F 16/22; G06F 16/285; G06F 2201/865;

(Continued)

(56) References Cited

U.S. PATENT DOCUMENTS

| 6,606,003 | B2 | 8/2003 | Conroy |
| 7,051,099 | B2 | 5/2006 | Ziegler |
| 7,215,992 | B2 | 5/2007 | Stahmann |

(Continued)

*Primary Examiner* — Shyue Jiunn Hwa
(74) *Attorney, Agent, or Firm* — Schwegman Lundberg Woessner

(57) ABSTRACT

Methods and systems for anomaly detection in relational databases. The methods and systems perform operations comprising: accessing a data object including a data set that has been collected over a given time interval; selecting a reference data point from the data set; computing an angle representing a data growth rate of the data set at least within the given time interval relative to the reference data point; determining that the angle representing the data growth rate of the data set within the given time interval exceeds a specified threshold; and in response to determining that the angle representing the data growth rate of the data set within the given time interval exceeds the specified threshold, triggering an anomaly detection operation.

20 Claims, 8 Drawing Sheets

(58) Field of Classification Search
CPC ............. G06F 2201/88; G06F 9/45533; G06F 9/4881; G06F 16/00
See application file for complete search history.

(56) References Cited

U.S. PATENT DOCUMENTS

| | | |
|---|---|---|
| 7,333,436 B2 | 2/2008 | Fukuda |
| 7,636,918 B2 | 12/2009 | Kadashevich |
| 7,765,528 B2 | 7/2010 | Findeisen |
| 7,962,524 B2 | 6/2011 | Okamoto |
| 8,219,856 B2 | 7/2012 | Martinez |
| 10,027,382 B2 | 7/2018 | Kyles |
| 10,350,418 B2 | 7/2019 | An |
| 2005/0080589 A1 | 4/2005 | Tiberi |
| 2005/0262923 A1 | 12/2005 | Kates |
| 2008/0178189 A1 | 7/2008 | Findeisen |
| 2008/0250276 A1 | 10/2008 | Martinez |
| 2011/0237238 A1* | 9/2011 | Hassan ............. H04M 15/8022 455/422.1 |
| 2017/0034297 A1 | 2/2017 | Waheed |
| 2017/0345035 A1 | 11/2017 | Zeng |
| 2020/0257680 A1* | 8/2020 | Danyi .................. G06F 11/302 |
| 2020/0409339 A1* | 12/2020 | Arashanipalai ....... G06F 16/906 |
| 2022/0005565 A1* | 1/2022 | Lyman .................. G16H 15/00 |

* cited by examiner

ANOMALY DETECTION IN RELATIONAL DATABASES

CROSS REFERENCE TO RELATED APPLICATIONS

This application is a continuation of U.S. application Ser. No. 17/121,827, which was filed Dec. 15, 2020. The entire disclosure of said application is incorporated herein by reference.

BACKGROUND

Users are increasingly using the Internet, such as websites, to access information and perform transactions. As more and more services become available over the Internet, the load placed on servers that host the various services increase. Identifying when the load placed on the servers reaches a critical point is important to maintaining and providing a high quality of service to the end users with minimal data loss or lag.

DETAILED DESCRIPTION

Example methods and systems for an anomaly detection system are described. In the following description, for purposes of explanation, numerous specific details are set forth in order to provide a thorough understanding of example embodiments. It will be evident, however, to one of ordinary skill in the art that embodiments of the invention may be practiced without these specific details.

Online transactions typically consume resources of one or more servers. Such resources include memory allocated to various services hosted by the servers. The amount of memory that each server can allocate is typically physically limited. As such, over time, the servers may need to be rebooted in order to re-allocate the memory resources. Rebooting the servers too often can increase lag experienced by the end users or services that use the servers, as data needs to be retrieved and allocated to the memory more often. However, rebooting the servers infrequently can keep stale data allocated on the memory which also slows down the end user experience as less memory is available to the services the users consume. Typical systems are configured to be automatically or manually rebooted at periodic intervals to address these shortcomings. However, such periodic rebooting operations may not account for certain abnormal or unexpected behavior of the server resources, such as if memory is being allocated at a greater than expected rate.

The disclosed embodiments provide systems and methods to identify resource utilization anomalies to automatically or manually trigger an anomaly detection operation, such as a rebooting operation. The disclosed embodiments are discussed in relation to server query language (SQL) type servers and are similarly applicable to any other type of server or resource. Specifically, the disclosed embodiments access a data set that has been collected over a given time interval and compute an angle representing a data growth rate of the data set at least within a given time interval relative to a reference data point. The disclosed embodiments determine that the angle representing the data growth rate of the data set within the given time interval exceeds a specified threshold and, in response, trigger an anomaly detection operation.

In this way, rather than waiting for a periodic reboot operation to be performed, the disclosed embodiments can detect abnormal behaviors of the server resources ahead of the periodic reboot operation and can generate an anomaly detection operation to address the abnormal behavior. This can allow resources of a server to be reallocated more quickly and efficiently which can improve the quality of service that an end user experiences.

Figure 1:
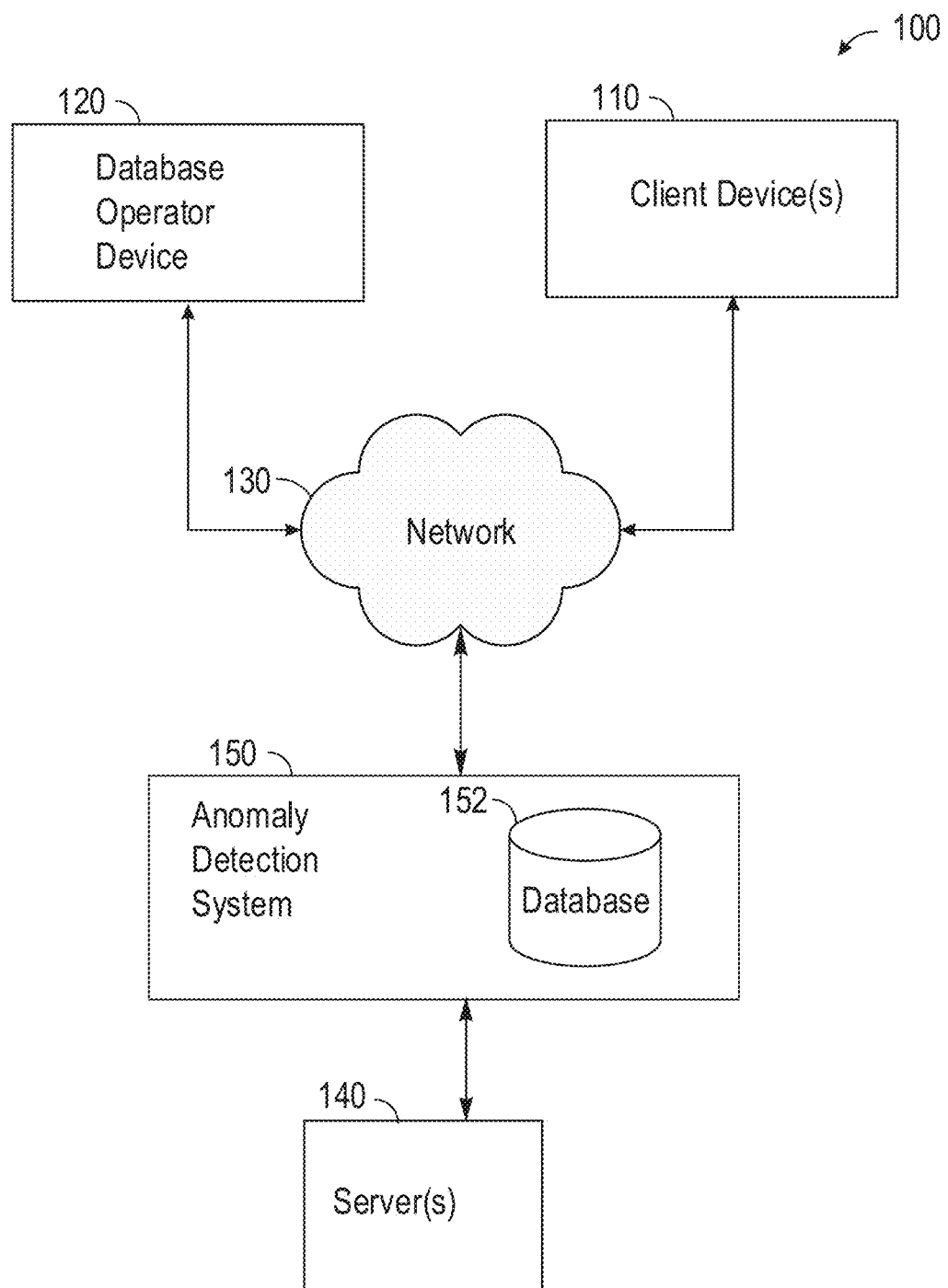
FIG. 1 is a block diagram of an example anomaly detection system, according to some embodiments.

FIG. 1 is a block diagram showing an example system 100 according to various exemplary embodiments. The system 100 can be a server system that allocates memory resources to one or more services for consumption by one or more client devices 110. The system 100 includes one or more client devices 110, a database operator device 120, an anomaly detection system 150, and one or more servers 140 that are communicatively coupled over a network 130 (e.g., Internet, telephony network).

As used herein, the term "client device" may refer to any machine that interfaces with a communications network (such as network 130) to obtain resources from one or more servers 140. The client device 110 may be, but is not limited to, a mobile phone, desktop computer, laptop, portable digital assistants (PDAs), smart phones, a wearable device (e.g., a smart watch), tablets, ultrabooks, netbooks, laptops, multi-processor systems, microprocessor-based or programmable consumer electronics, game consoles, set-top boxes, or any other communication device that a user may use to access a network or a service hosted by the servers 140.

The network 130 may include, or operate in conjunction with, an ad hoc network, an intranet, an extranet, a virtual private network (VPN), a local area network (LAN), a wireless network, a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The servers 140 host one or more services that are accessed by the client devices 110. For example, the servers 140 can host a teleconference or video conference service that enables multiple client devices 110 to communicate with each other. To instantiate and enable the teleconference or video conference service, the teleconference or video conference service can be allocated memory resources of the server 140. The amount of memory resources that are allocated to the teleconference or video conference service can grow over time. In some instances, when many client devices 110 request access to the services hosted by the servers 140, the memory allocations of the server 140 can grow rapidly beyond an expected rate. In some instances, memory leaks of the server 140 grow when services hosted by the servers 140 incorrectly manage memory allocations and fail to release unused memory. Any of these can be classified as abnormal behaviors of the resource utilization of the servers 140 which can be addressed in many ways. One way to address these abnormal behaviors is to reboot the servers 140 before the scheduled reboot operations or to allow the servers 140 to allocate more memory than previously configured and/or to resolve memory leaks. Other ways to address these abnormal behaviors can be contemplated.

The anomaly detection system 150 monitors the resource utilization of the servers 140. The anomaly detection system 150 analyzes the resource utilization over a given time interval to detect the abnormal behaviors. For example, the anomaly detection system 150 can access a data set that has been collected over a given time interval and can compute an angle representing a data growth rate of the data set at least within a given time interval relative to a reference data point. In some instances, the data growth rate represents memory leaks (e.g., memory allocated to services that have not been recently used or for which the services are no longer running). If the angle representing the data growth rate of the data set within the given time interval exceeds a specified threshold the anomaly detection system 150 can trigger an anomaly detection operation. As an example, the anomaly detection system 150 can transmit a communication to a database operator device 120 that identifies the server 140 on which the abnormal behavior was detected. The database operator device 120 can present a prompt to a database operator (user) that identifies the server 140 on which the abnormal behavior was detected and provides an option to address the abnormal behavior. For example, the prompt provided by the database operator device 120 can include a reboot option that causes the server 140 on which the abnormal behavior was detected to be rebooted by the anomaly detection system 150.

In some embodiments, the anomaly detection system 150 analyzes the growth rate of the resource utilization across each server 140 on an individual basis. Specifically, the anomaly detection system 150 can obtain a data point that indicates the current memory that is being utilized or allocated by a particular server 140. The anomaly detection system 150 can also obtain a data point representing a previous utilization of the resource on the server 140, such as in the past 24 hours. Namely, the anomaly detection system 150 can maintain a history of resource utilizations in a 24-hour period in a database 152 or any other suitable time interval. The anomaly detection system 150 can compute an angle representing a resource utilization growth rate (e.g., a data growth rate) by drawing a line from the previous utilization data point to the current data utilization point. An angle of the line relative to a common axis (e.g., the x-axis) is determined. The anomaly detection system 150 can obtain a resource utilization threshold (e.g., a maximum angle of, for example, 5 degrees) for the specific server 140 or for the collection of servers 140 from the database 152. The anomaly detection system 150 can compare the computed angle with the threshold to determine if the resource utilization exceeds the threshold. In response to determining that the resource utilization exceeds the threshold, the anomaly detection system 150 triggers the anomaly detection operation.

In some embodiments, the anomaly detection system 150 generates a data set that includes a history of resource utilizations, such as a plurality of resource utilizations of server 140 over a given time interval. For example, the anomaly detection system 150 captures a collection of data at a capture rate. Specifically, at each point in time within a capture rate (e.g., every ten minutes), the anomaly detection system 150 can query a given server 140 to obtain the current resource utilization of the server 140. The anomaly detection system 150 can store the current resource utilization of the given server 140 in the database 152. In some cases, rather than capturing the resource utilization data every ten minutes, the anomaly detection system 150 obtains the resource utilization of the given server 140 once every minute. Anomaly detection system 150 may obtain the resource utilization of the server 140 at other time intervals as appropriate (e.g., once every five minutes, once every 20 minutes, and the like), all of which are within the scope of the present disclosure. The anomaly detection system 150 may then collect a set of, e.g., ten data points that have been collected over the past ten minutes and aggregate them (e.g., compute a sum and/or average of the past ten data points) into a given data point. In this example, a single data point in a collection represents resource utilization of a server 140 across a ten minute interval.

In some implementations, the anomaly detection system 150 applies a first order central gradient to the collected data (e.g., the past ten data points collected over the past 10 minutes) to smooth the data and reduce noise. Specifically, each time that the memory utilization of a server is captured as part of the set of data points, its values can vary in a zig zag looking pattern; except for the reboot time in which the data drops significantly. In an example, the value of an event that has been captured in the past minute can be in the higher side of the zig zag pattern while the value that was captured three minutes prior to the past minute (e.g., 3 minutes ago), can lean towards the lower side of the zig zag pattern. In some cases, calculation of the difference between an event that is in the low side of zig zag versus another event in the higher side of zig zag can be avoided (e.g., such an event can be characterized as noise). One way to reduce the noise is to use a first order central gradient method. In the first order central gradient method, for every event (e.g., each point of the ten data points), the average utilization value is selected for its preceding and proceeding events and such an average value is considered as the value in further analysis (e.g., instead of the actual value that was observed). This process can smooth the zig zag behavior of data and prepares the data for more accurate analysis. Another technique that is can be used for smoothing the data (in addition to or instead of the first order central gradient method) is a moving average technique. In this technique, the average of "n" prior events can be used as a substitute of the value of each event (e.g., each point of the past ten data points) to reduce the noise. This method only looks at the past events and depending on the value of a chosen "n", (e.g. 2, 3, 4, 5, 10, . . . ), the average may be in favor of higher or lower zig zag trended values.

In some embodiments, the anomaly detection system 150 obtains a reference data point that corresponds to a start of a given time interval. For example, the anomaly detection system 150 queries the database 152 to obtain the smoothed and aggregated data point that represents the resource utilization of a given server 140 at a point in time 24 hours prior to the current time (e.g., if the time interval is 24 hours). The anomaly detection system 150 can then obtain a window of samples that includes a plurality of consecutive data samples collected over a period of time following the given time interval. For example, the anomaly detection system 150 aggregates in ten minute intervals data points that represent the current resource utilization of the server 140. In one case, the anomaly detection system 150 can obtain data every minute representing the resource utilization of the server 140 and then aggregates, sums and/or averages, ten data points into a single data point. In another case, the anomaly detection system 150 can obtain data representing current resource utilization every ten minutes and store that data as a data point representing resource utilization of the server 140.

In an embodiment, to compute or determine a growth rate of resource utilization (e.g., the memory leaks), the anomaly detection system 150 computes a first angle representing a first growth rate of the data at the server 140 between the reference data point and a first data point in the window of samples. For example, the current time may be LOAM and the anomaly detection system 150 retrieves the resource utilization at LOAM on the prior day as the reference data point. The anomaly detection system 150 can obtain a first data point that represents the current resource utilization by aggregating ten minutes worth of resource utilization following LOAM. Namely, the first data point represents the resource utilization of the server from 10 AM-10:10 AM. The anomaly detection system 150 can compute a first angle between the reference data point of LOAM and the first data point that represents the resource utilization of the server from 10 AM-10:10 AM. The anomaly detection system 150 can compare the computed angle to a threshold associated with the server 140. For example, the anomaly detection system 150 determines if the computed angle exceeds a threshold of 5 degrees.

Next, the anomaly detection system 150 can continue computing a plurality of additional angles for at least ten more ten minute intervals (e.g., for a total of 100 minutes following the given time interval). For example, the anomaly detection system 150 obtains a second data point that represents the current resource utilization by aggregating ten minutes worth of resource utilization following 10:10 AM. Namely, the second data point represents the resource utilization of the server from 10:10 AM-10:20 AM. The anomaly detection system 150 can compute a second angle between the reference data point of LOAM and the second data point that represents the resource utilization of the server from 10:10 AM-10:20 AM. The anomaly detection system 150 can compare the computed angle to a threshold associated with the server 140. For example, the anomaly detection system 150 determines if the computed angle exceeds 5 degrees. If the anomaly detection system 150 determines that a majority of the plurality of angles (e.g., if seven or six or more) of the computed angles relative to the reference point exceed the 5 degree angle, then the anomaly detection system 150 can trigger an anomaly detection operation. In some cases, instead of using a common reference point (e.g., the point corresponding to LOAM) for computing the plurality of angles for the 100 minute time window, the anomaly detection system 150 can continuously adjust the reference data point by 10 minutes. In this example, the current data point under consideration is always 24 hours (or a threshold time interval) away from the reference data point.

In some embodiments, the anomaly detection system 150 detects a negative angle in the set of computed angles. The anomaly detection system 150 can determine whether the negative angle is immediately adjacent and precedes the positive growth rate. In response to determining that the computed angle representing the positive data growth rate of the data set is adjacent to the negative angle, the anomaly detection system 150 can determine whether the computed angle is greater than the specified threshold by more than a reboot amount. Specifically, prior to triggering the anomaly detection operation invariable whenever the growth rate exceeds a specified threshold (e.g. exceeds 5 degrees), the anomaly detection system 150 can determine whether a prior condition (e.g., a prior reboot operation) occurred before the growth rate reached the value that exceeded the threshold. Namely, if a server 140 is rebooted, it can be expected that following a reboot, the growth rate of data will be very high in the beginning and then slowly stabilize. Such a condition may be determined to be normal and the anomaly detection system 150 can be configured to prevent detecting such a condition as abnormal to trigger the anomaly detection operation. To determine this condition, the anomaly detection system 150 can determine that a negative growth rate precedes immediately a growth rate that exceeds the growth rate threshold for a server. If so, a further comparison between the growth rate and a reboot growth rate threshold (e.g., 79 degrees) can be performed to determine whether to prevent triggering the anomaly detection operation. Namely, if the positive growth rate following the negative growth rate exceeds the reboot growth rate threshold (e.g., the positive growth rate has an angle that exceeds 79 degrees), the anomaly detection system 150 can prevent triggering the anomaly detection operation.

In some embodiments, the anomaly detection system 150 counts a number of times within a specified time period that the anomaly detection operation has been triggered. For example, the anomaly detection system 150 tracks how often the angle (or a majority of a plurality of angles) representing the data growth rate of the data set within a given time interval exceeds a specified threshold. Each time the data growth rate exceeds the specified threshold, the anomaly detection system 150 can trigger the anomaly detection operation. However, if the anomaly detection system 150 determines that more than a specified amount (e.g., more than 3 times) of anomaly detection operations have been triggered within a set period of time (e.g., 1 day), the anomaly detection system 150 may temporarily and selectively discontinue determining that the angle representing the data growth rate exceeds the specified threshold.

Figure 2:
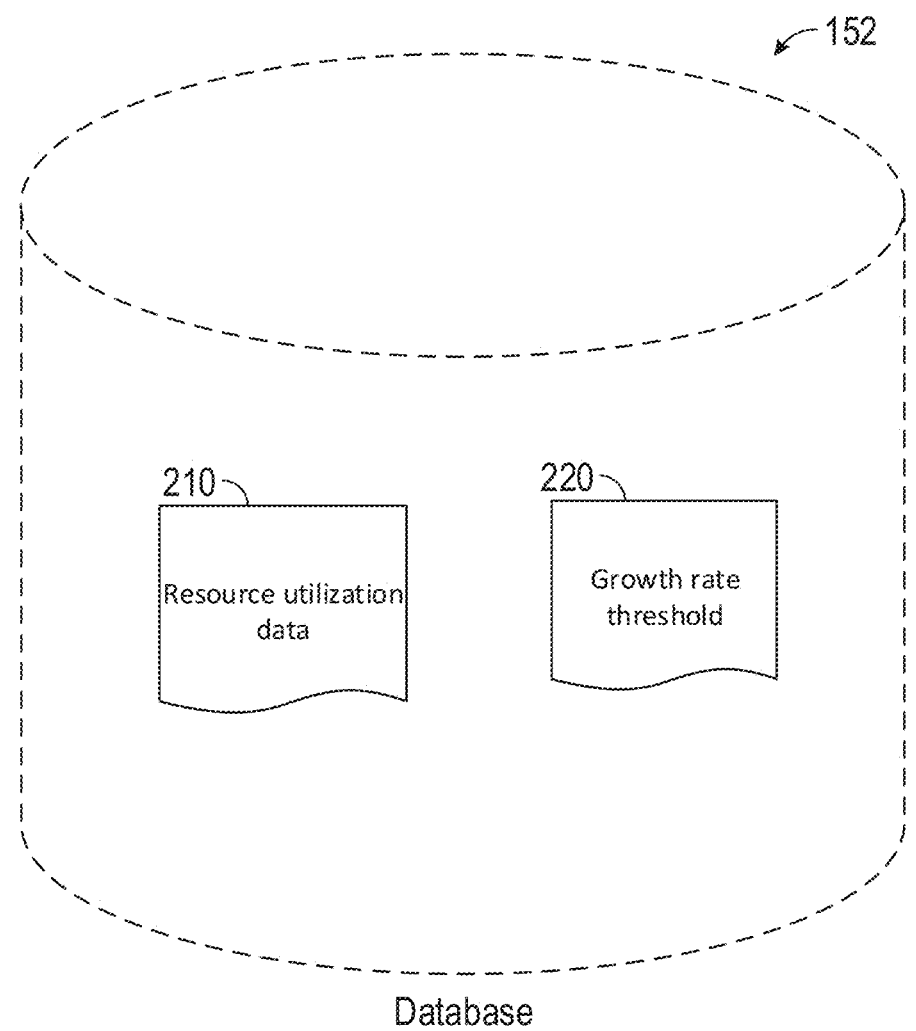
FIG. 2 is an example database that may be deployed within the system of FIG. 1, according to some embodiments.

FIG. 2 is an example database 152 that may be deployed within the system of FIG. 1, according to some embodiments. As shown, the database 152 includes resource utilization data 210 and growth rate threshold 220. The resource utilization data 210 can store a collection of data points representing resource utilization, such as memory allocations, on each server 140 on a per server basis. The resource utilization data 210 can include aggregated data points, such as data collected every minute and averaged and/or summed into a single data point. The resource utilization data 210 stores seventy-two hours' worth of resource utilization but any more or less amount of data can be maintained and tracked.

The growth rate threshold 220 can store one or more thresholds for all of the servers 140 or for each individual server 140. The growth rate threshold 220 can also store the reboot growth rate threshold for all of the servers 140 or for each individual server 140. As an example, a first server 140 may be assigned and associated with a first growth rate threshold 220 (e.g., 4.5 degrees) and a second server 140 may be assigned and associated with a second growth rate threshold 220 (e.g., 5 degrees). In such circumstances, resource utilization of the first server may be more likely to trigger anomaly detection operations than the second server because a slower growth of data on the first server relative to the second server may be characterized as exceeding the threshold which controls and triggers the anomaly detection operation. For example, if within a given time interval, resource utilization grows at the same rate on the first and second servers which corresponds to a resource utilization angle of 4.8 degrees, an anomaly detection operation will be triggered for the first server (which has the first growth rate threshold of 4.5 degrees) and not for the second server (which has the first growth rate threshold of 5 degrees).

Figure 3:
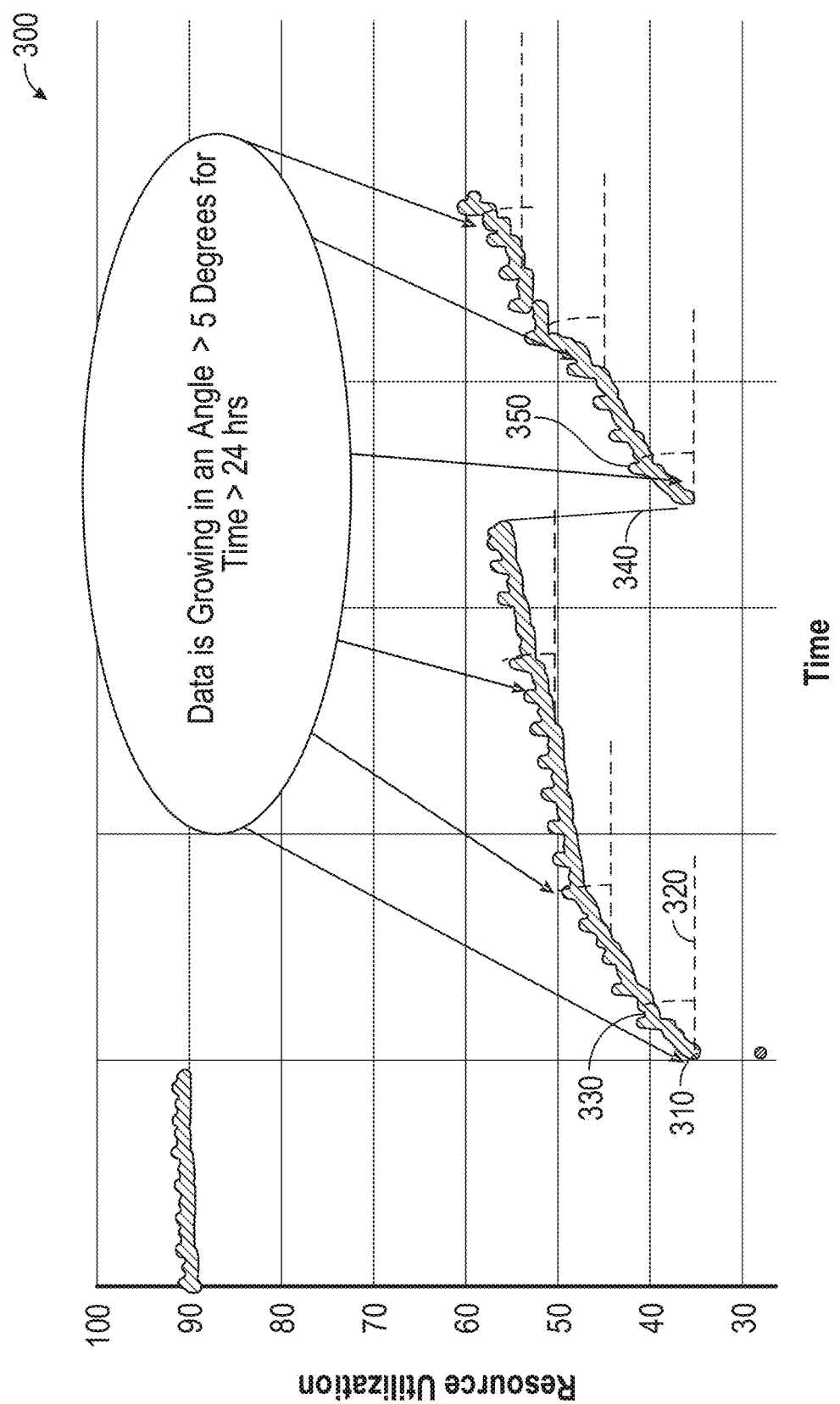
FIG. 3 illustrates example resource utilization data collected by the system of FIG. 1, according to some embodiments.

FIG. 3 illustrates exemplary resource utilization data 300 collected by the system of FIG. 1, according to some embodiments. For example, the resource utilization data 300 includes a plurality of points each representing current resource utilization (e.g., memory allocations) for a particular server 140. In some embodiments, the anomaly detection system 150 obtains a reference point 310 corresponding to a point at a start of a time interval (e.g., a data point representing resource utilization 24 hours prior to the current time). The anomaly detection system 150 obtains a first data point 330 corresponding to the current resource utilization (e.g., a point that aggregates 10 minutes worth of resource utilization of the server 140). The anomaly detection system 150 computes an angle relative to a common axis 320 between the reference point 310 and the first data point 330. In response to determining that the angle exceeds a specified threshold (e.g., is greater than 5 degrees), the anomaly detection system 150 can trigger an anomaly detection operation.

The anomaly detection system 150 can also detect negative data growth rate 340 at a particular time point. This may have occurred because of an automated or manual reboot operation performed on the server 140. In such cases, the anomaly detection system 150 can compute an angle of the data growth rate immediately adjacent to the negative growth rate 340. Namely, the anomaly detection system 150 can compute the angle of the growth rate 350. The anomaly detection system 150 can determine if the angle of the growth rate 350 exceeds a reboot threshold (which may be greater than the specified threshold of 5 degrees set for triggering an anomaly detection operation). If the angle of the growth rate 350 exceeds the reboot threshold (exceeds 79 degrees), the anomaly detection system 150 can prevent triggering the anomaly detection operation.

Figure 4:
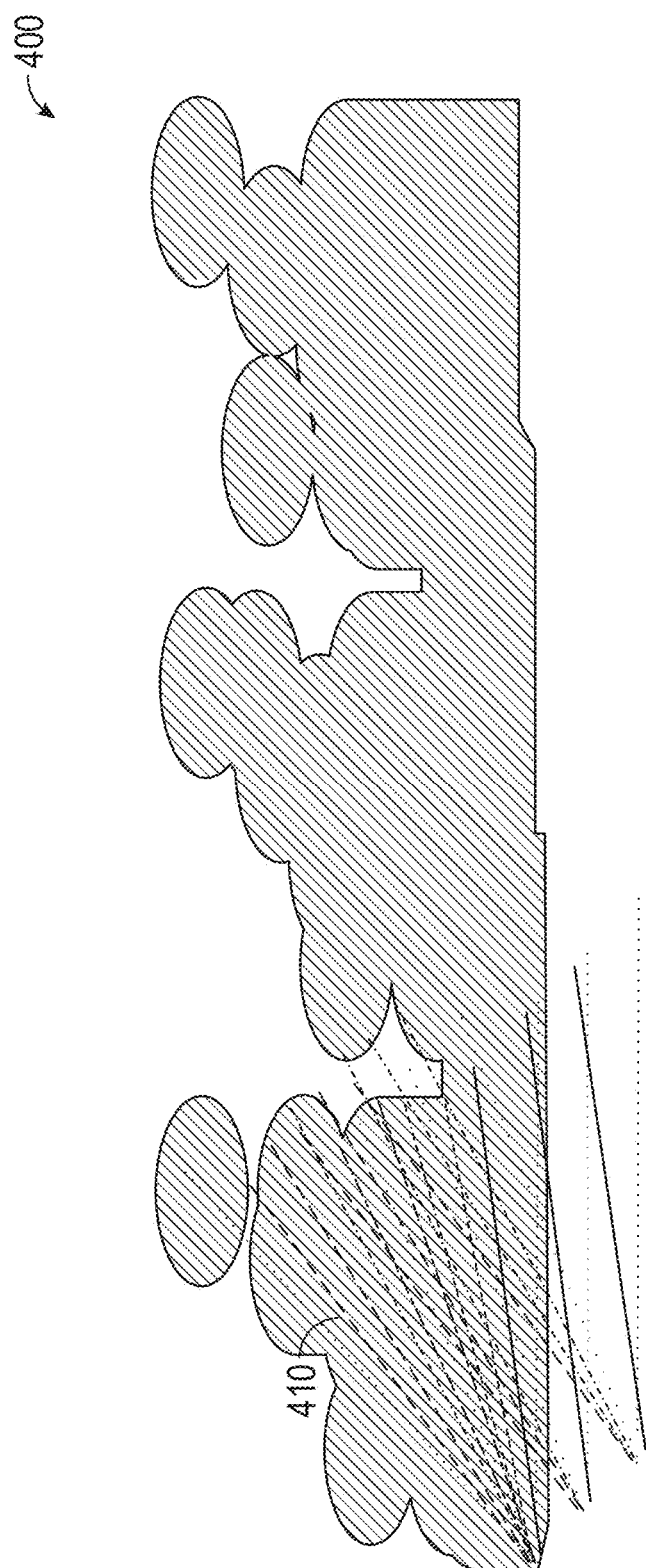
FIG. 4 illustrates an example data growth rate that is determined by the system of FIG. 1, according to some embodiments.

FIG. 4 illustrates an example data growth rate 400 that is determined by the system of FIG. 1, according to some embodiments. In some embodiments, the anomaly detection system 150 computes a plurality of angles 410. The anomaly detection system 150 can trigger the anomaly detection operation if a majority or supermajority (e.g., 7 out of 10 angle comparisons) exceed the specified threshold for the server 140. Specifically, the anomaly detection system 150 can obtain a reference point (corresponding to resource utilization at a start of a time interval) and computes multiple angles between the reference point and a collection of samples (e.g., 10 samples) obtained following the time interval. For example, the anomaly detection system 150 computes a first angle between the reference point and ten minutes past the end of the time interval (e.g., if the reference point corresponds to LOAM on a prior day, the first angle represents data growth from LOAM on the prior day to 10:10 AM on the current day). The anomaly detection system 150 can compute a second angle between the reference point and a period between ten minutes past the end of the time interval and twenty minutes past the end of the time interval (e.g., if the reference point corresponds to LOAM on a prior day, the second angle represents data growth from LOAM on the prior day to 10:20 AM on the current day or from 10:10 AM on the prior day and 10:20 AM on the current day). The anomaly detection system 150 can continue computing a plurality of angles (e.g., ten or more angles) for sequential time periods following the given time interval corresponding to the reference point. The anomaly detection system 150 can then determine whether a majority or seven or more out of the number of angles that have been computed exceeds the specified threshold (e.g., whether seven or more angles are greater than 5 degrees). If so, the anomaly detection system 150 can trigger an anomaly detection operation.

Figure 5:
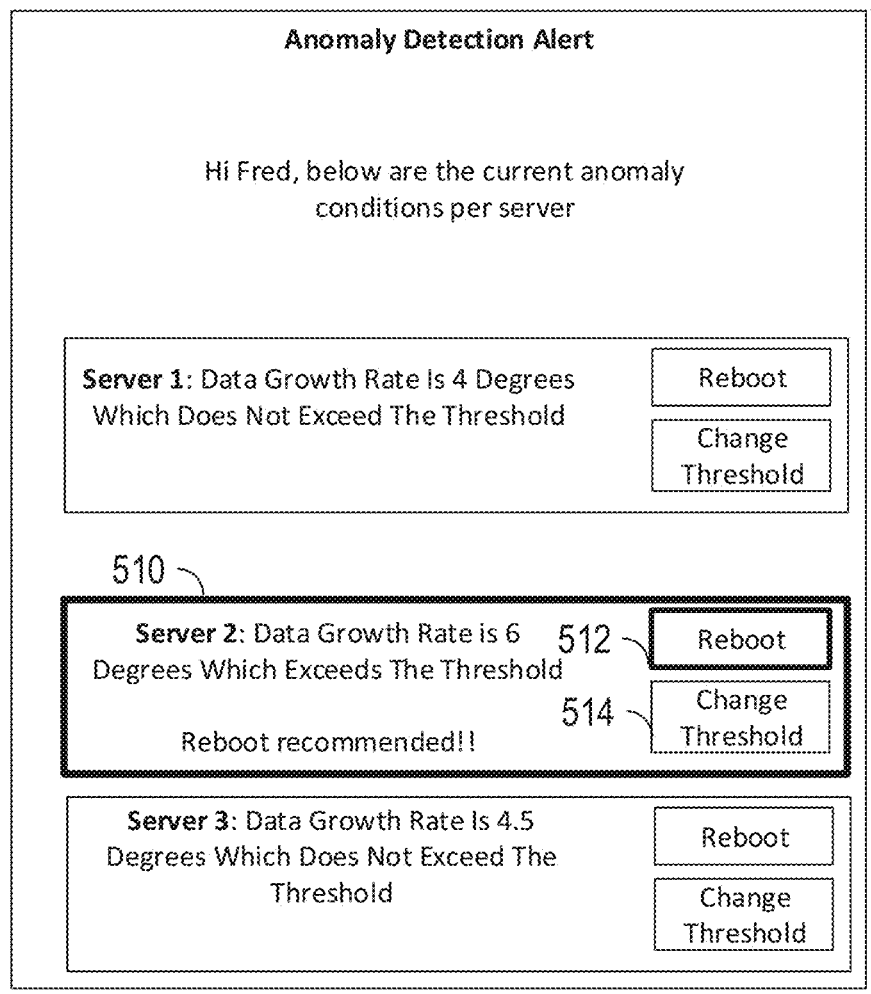
FIG. 5 is an example anomaly detection alert generated by the system of FIG. 1, according to example embodiments.

FIG. 5 is an example anomaly detection alert 500 generated by the system of FIG. 1, according to example embodiments. For example, triggering an anomaly detection operation by the anomaly detection system 150 may transmit a communication to the database operator device 120 to generate the anomaly detection alert 500 in a graphical user interface of the database operator device 120. The anomaly detection alert 500 may be presented to a system or database administrator. The anomaly detection alert 500 may include information that identifies resource utilization across a collection of servers 140.

In response to receiving the anomaly detection operation communication from the anomaly detection system 150, the anomaly detection alert 500 can visually highlight or visually distinguish the information for the server 140 associated with the anomaly detection operation in the anomaly detection alert 500. For example, the anomaly detection system 150 may determine that server number 2 out of the servers 140 has a data growth rate that is growing at an angle that exceeds a specified threshold. In response, the anomaly detection system 150 identifies server number 2 to the database operator device 120. The database operator device 120 draws a red or blue border or flashes a region 510 of the display corresponding to server number 2. The database operator device 120 also presents a textual alert indicating a recommended action to address the detected anomaly for server number 2.

The region 510 corresponding to server number 2 may include a reboot option 512 and a change threshold option 514. In response to receiving input that selects the reboot option 512, the database operator device 120 can send a message to the server 140 associated with the region 510 instructing the server 140 to perform a reboot operation. In response to receiving input that selects the change threshold option 514, the database operator device 120 can retrieve from the database 152 the growth rate threshold 220 associated with the server number 2. The database operator device 120 presents the current growth rate threshold (e.g., 5 degrees) and allows the user to increase or decrease the currently set growth rate threshold. Once the user is satisfied with the newly set value, the database 152 can be updated to cause future anomaly detection operations to be triggered based on the newly set growth rate threshold.

The user can similarly change thresholds set for other servers by selecting the corresponding change threshold option presented in a region for the other servers. Other servers can also similarly be rebooted using reboot options presented in their respective user interface regions even though anomaly detection operations have not been triggered for the other servers.

Figure 6:
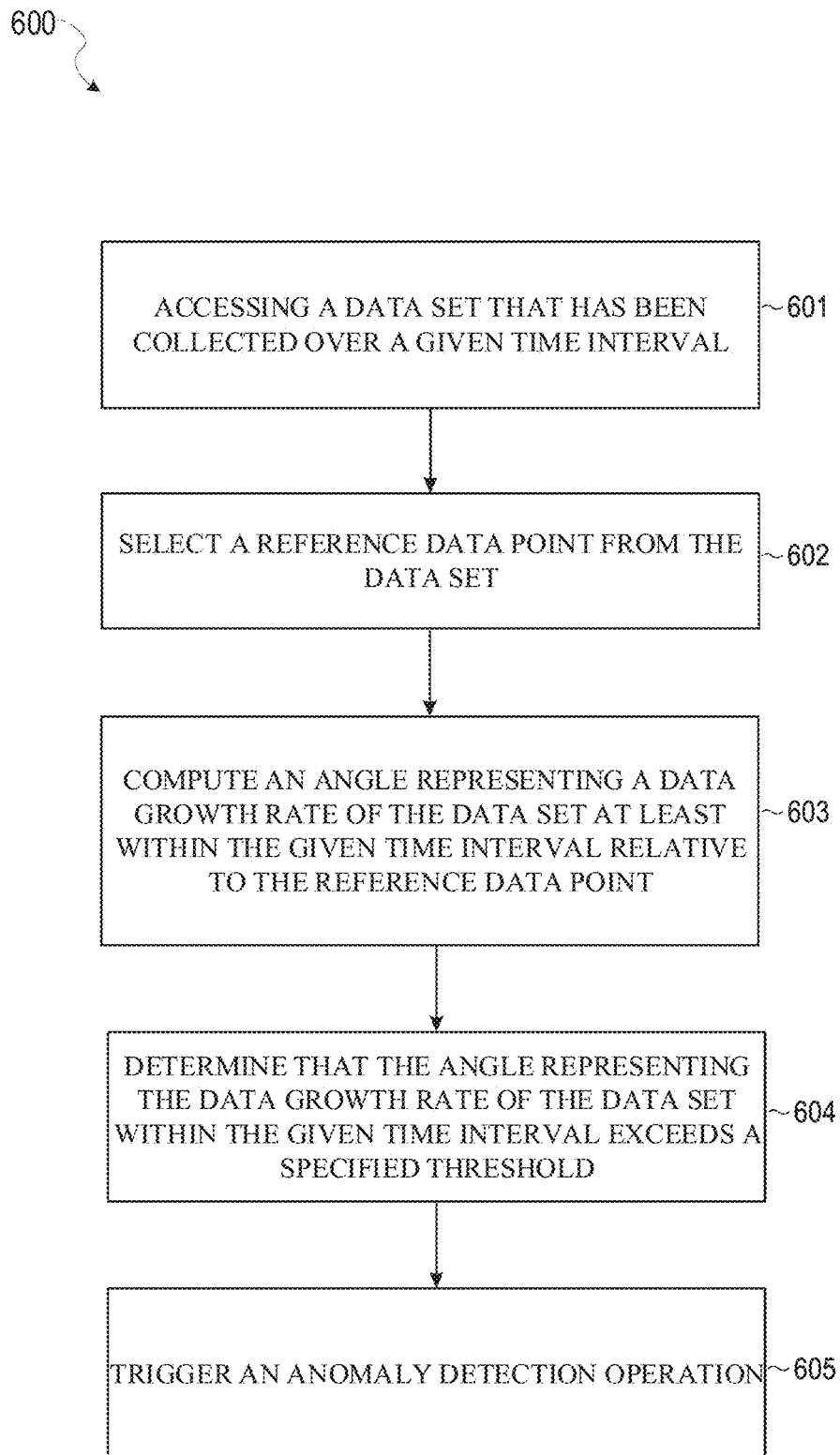
FIG. 6 is a flowchart illustrating example operations of the anomaly detection system, according to example embodiments.

FIG. 6 is a flowchart illustrating example operations of the anomaly detection system in performing process 600, according to example embodiments. The process 600 may be embodied in computer-readable instructions for execution by one or more processors such that the operations of the process 600 may be performed in part or in whole by the functional components of the system 100; accordingly, the process 600 is described below by way of example with reference thereto. However, in other embodiments, at least some of the operations of the process 600 may be deployed on various other hardware configurations. Some or all of the operations of process 600 can be in parallel, out of order, or entirely omitted.

At operation 601, the anomaly detection system 150 accesses a data set that has been collected over a given time interval. For example, the anomaly detection system 150 collects data that represents memory utilization or allocation across the servers 140.

At operation 602, the anomaly detection system 150 selects a reference data point from the data set. For example, the anomaly detection system 150 selects a data point at the start of a 24 hour time interval (e.g., a point representing memory allocations on an adjacent prior day relative to the current time).

At operation 603, the anomaly detection system 150 computes an angle representing data growth rate of the data set at least within the given time interval relative to the reference data point.

At operation 604, the anomaly detection system 150 determines that the angle representing the data growth rate of the data set within the given time interval exceeds a specified threshold. For example, the anomaly detection system 150 determines if within a 24 hour time interval, data grew at more than 5 degrees.

At operation 605, the anomaly detection system 150 triggers an anomaly detection operation. For example, the anomaly detection system 150 presents the anomaly detection alert 500 on a user interface of the database operator device 120.

Figure 7:
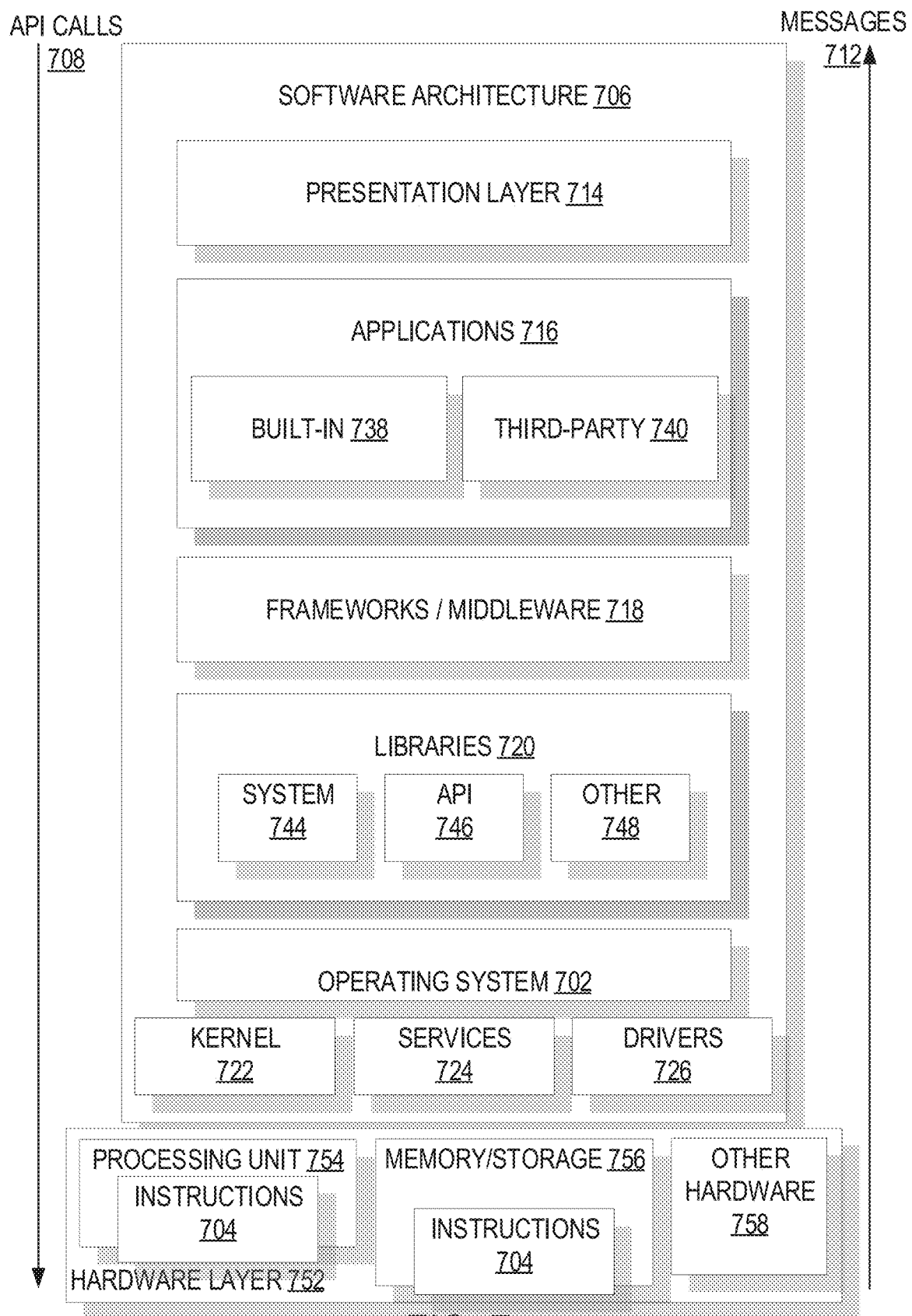
FIG. 7 is a block diagram illustrating an example software architecture, which may be used in conjunction with various hardware architectures herein described.

FIG. 7 is a block diagram illustrating an example software architecture 706, which may be used in conjunction with various hardware architectures herein described. FIG. 7 is a non-limiting example of a software architecture and it will be appreciated that many other architectures may be implemented to facilitate the functionality described herein. The software architecture 706 may execute on hardware such as machine 800 of FIG. 8 that includes, among other things, processors 804, memory 814, and input/output (I/O) components 818. A representative hardware layer 752 is illustrated and can represent, for example, the machine 800 of FIG. 8. The representative hardware layer 752 includes a processing unit 754 having associated executable instructions 704. Executable instructions 704 represent the executable instructions of the software architecture 706, including implementation of the methods, components, and so forth described herein. The hardware layer 752 also includes memory and/or storage devices memory/storage 756, which also have executable instructions 704. The hardware layer 752 may also comprise other hardware 758. The software architecture 706 may be deployed in any one or more of the components shown in FIG. 1 or 2. The software architecture 706 can be utilized to detect anomalies on one or more servers when a data growth rate exceeds a specified threshold and trigger an anomaly detection operation.

In the example architecture of FIG. 7, the software architecture 706 may be conceptualized as a stack of layers where each layer provides particular functionality. For example, the software architecture 706 may include layers such as an operating system 702, libraries 720, frameworks/middleware 718, applications 716, and a presentation layer 714. Operationally, the applications 716 and/or other components within the layers may invoke API calls 708 through the software stack and receive messages 712 in response to the API calls 708. The layers illustrated are representative in nature and not all software architectures have all layers. For example, some mobile or special purpose operating systems may not provide a frameworks/middleware 718, while others may provide such a layer. Other software architectures may include additional or different layers.

The operating system 702 may manage hardware resources and provide common services. The operating system 702 may include, for example, a kernel 722, services 724, and drivers 726. The kernel 722 may act as an abstraction layer between the hardware and the other software layers. For example, the kernel 722 may be responsible for memory management, processor management (e.g., scheduling), component management, networking, security settings, and so on. The services 724 may provide other common services for the other software layers. The drivers 726 are responsible for controlling or interfacing with the underlying hardware. For instance, the drivers 726 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 720 provide a common infrastructure that is used by the applications 716 and/or other components and/or layers. The libraries 720 provide functionality that allows other software components to perform tasks in an easier fashion than to interface directly with the underlying operating system 702 functionality (e.g., kernel 722, services 724 and/or drivers 726). The libraries 720 may include system libraries 744 (e.g., C standard library) that may provide functions such as memory allocation functions, string manipulation functions, mathematical functions, and the like. In addition, the libraries 720 may include API libraries 746 such as media libraries (e.g., libraries to support presentation and manipulation of various media format such as MPREG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 720 may also include a wide variety of other libraries 748 to provide many other APIs to the applications 716 and other software components/devices.

The frameworks/middleware 718 (also sometimes referred to as middleware) provide a higher-level common infrastructure that may be used by the applications 716 and/or other software components/devices. For example, the frameworks/middleware 718 may provide various graphic user interface functions, high-level resource management, high-level location services, and so forth. The frameworks/middleware 718 may provide a broad spectrum of other APIs that may be utilized by the applications 716 and/or other software components/devices, some of which may be specific to a particular operating system 702 or platform.

The applications 716 include built-in applications 738 and/or third-party applications 740. Examples of representative built-in applications 738 may include, but are not limited to, a contacts application, a browser application, a book reader application, a location application, a media application, a messaging application, and/or a game application. Third-party applications 740 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 740 may invoke the API calls 708 provided by the mobile operating system (such as operating system 702) to facilitate functionality described herein.

The applications 716 may use built-in operating system functions (e.g., kernel 722, services 724, and/or drivers 726), libraries 720, and frameworks/middleware 718 to create UIs to interact with users of the system. Alternatively, or additionally, in some systems, interactions with a user may occur through a presentation layer, such as presentation layer 714. In these systems, the application/component "logic" can be separated from the aspects of the application/component that interact with a user.

Figure 8:
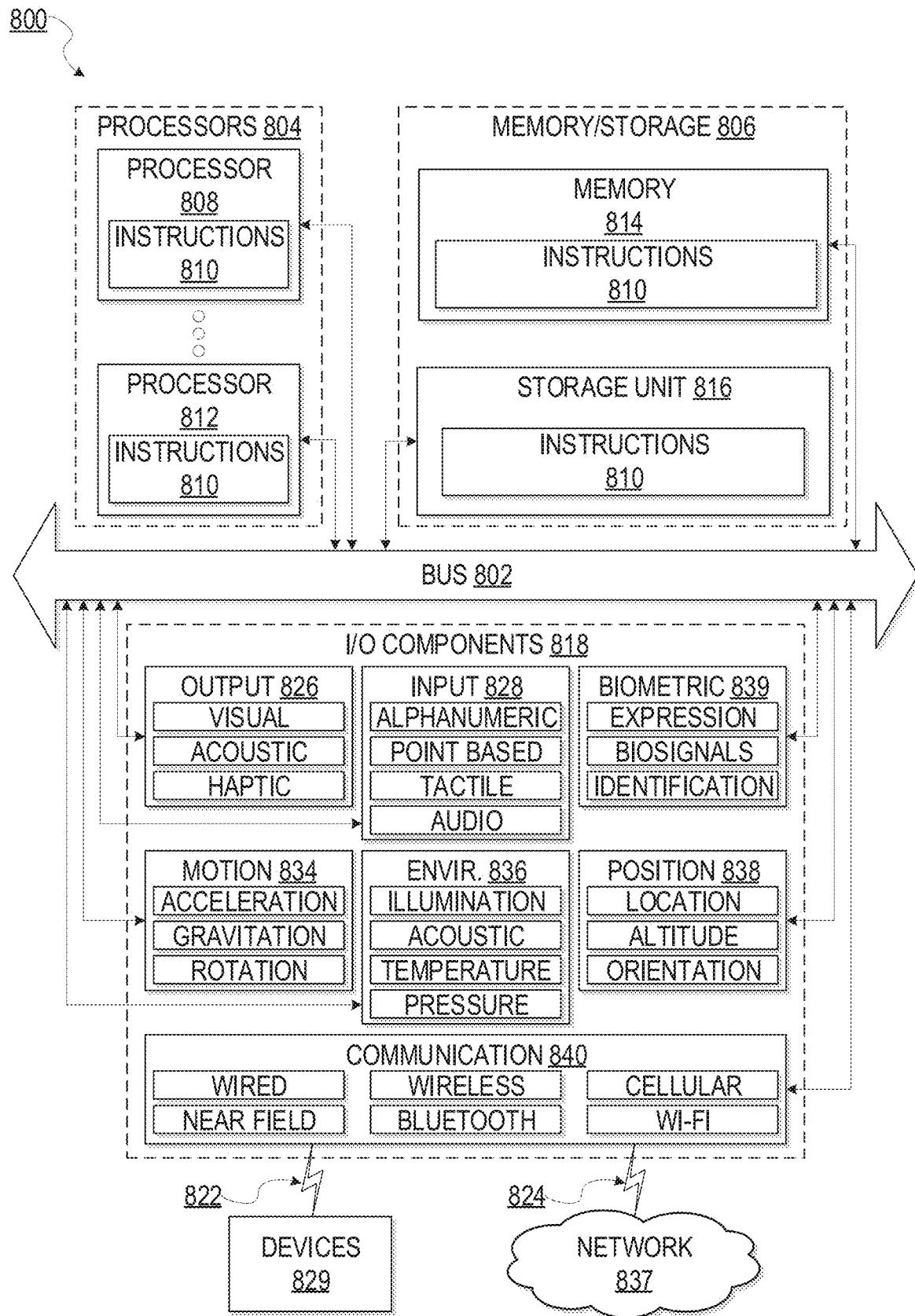
FIG. 8 is a block diagram illustrating components of a machine, according to some example embodiments.

FIG. 8 is a block diagram illustrating components of a machine 800, according to some example embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 810 (e.g., software, a program, an application, an applet, an app, or other executable code) for causing the machine 800 to perform any one or more of the methodologies discussed herein may be executed. For example, the instructions 810 may be executed by the anomaly detection system 150 to access data collected over a given interval to detect a data growth anomaly and trigger an anomaly detection operation.

As such, the instructions 810 may be used to implement devices or components described herein. The instructions 810 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but be not limited to a server computer, a client computer, a personal computer (PC), a tablet computer, a laptop computer, a netbook, a STB, a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 810, sequentially or otherwise, that specify actions to be taken by machine 800. Further, while only a single machine 800 is illustrated, the term "machine" shall also be taken to include a collection of machines that individually or jointly execute the instructions 810 to perform any one or more of the methodologies discussed herein.

The machine 800 may include processors 804, memory/storage 806, and I/O components 818, which may be configured to communicate with each other such as via a bus 802. In an example embodiment, the processors 804 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 808 and a processor 812 that may execute the instructions 810. The term "processor" is intended to include multi-core processors 804 that may comprise two or more independent processors (sometimes referred to as "cores") that may execute instructions contemporaneously. Although FIG. 8 shows multiple processors 804, the machine 800 may include a single processor with a single core, a single processor with multiple cores (e.g., a multi-core processor), multiple processors with a single core, multiple processors with multiple cores, or any combination thereof.

The memory/storage 806 may include a memory 814, such as a main memory, or other memory storage, database 110, and a storage unit 816, both accessible to the processors 804 such as via the bus 802. The storage unit 816 and memory 814 store the instructions 810 embodying any one or more of the methodologies or functions described herein. The instructions 810 may also reside, completely or partially, within the memory 814, within the storage unit 816, within at least one of the processors 804 (e.g., within the processor's cache memory), or any suitable combination thereof, during execution thereof by the machine 800. Accordingly, the memory 814, the storage unit 816, and the memory of processors 804 are examples of machine-readable media.

The I/O components 818 may include a wide variety of components to receive input, provide output, produce output, transmit information, exchange information, capture measurements. The specific I/O components 818 that are included in a particular machine 800 will depend on the type of machine. For example, portable machines such as mobile phones will likely include a touch input device or other such input mechanisms, while a headless server machine will likely not include such a touch input device. It will be appreciated that the I/O components 818 may include many other components that are not shown in FIG. 8. The I/O components 818 are grouped according to functionality merely for simplifying the following discussion and the grouping is in no way limiting. In various example embodiments, the I/O components 818 may include output components 826 and input components 828. The output components 826 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 828 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 818 may include biometric components 839, motion components 834, environmental components 836, or position components 838 among a wide array of other components. For example, the biometric components 839 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 834 may include acceleration sensor components (e.g., accelerometer), gravitation sensor components, rotation sensor components (e.g., gyroscope), and so forth. The environmental components 836 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 838 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 818 may include communication components 840 operable to couple the machine 800 to a network 837 or devices 829 via coupling 824 and coupling 822, respectively. For example, the communication components 840 may include a network interface component or other suitable device to interface with the network 837. In further examples, communication components 840 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 829 may be another machine or any of a wide variety of peripheral devices (e.g., a peripheral device coupled via a USB).

Moreover, the communication components 840 may detect identifiers or include components operable to detect identifiers. For example, the communication components 840 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 840, such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDA, smart phone, tablet, ultra book, netbook, laptop, multi-processor system, microprocessor-based or programmable consumer electronics, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a LAN, a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a CPU, a RISC processor, a CISC processor, a GPU, a DSP, an ASIC, a RFIC, or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

What is claimed is:

1. A system, comprising:
    a memory component;
    at least one processor communicatively coupled to the memory component, the at least one processor configured to:
        access a data object including a data set that has been collected over a time interval;
        select, from the data set, a reference data point representing a first resource utilization of a server at a starting point of the time interval, wherein the first resource utilization includes memory resources allocated by the server to one or more services;
        select a second data point from the data set, the second data point representing a second resource utilization of the server during a sample collection period following the time interval;
        compute an angle representing a resource utilization growth rate between the reference data point and the second data point, wherein the resource utilization growth rate includes at least the first resource utilization corresponding to the reference data point and the second resource utilization corresponding to the second data point;
        determine that the angle representing the resource utilization growth rate exceeds a threshold; and
        in response to determining that the angle representing the resource utilization growth rate exceeds the threshold,
            determine that at least one resource utilization anomaly occurred; and
            trigger an anomaly detection operation comprising at least one of: (i) rebooting the server and (ii) reallocating resources of the server.

2. The system of claim 1, wherein the at least one processor is further configured to:
    capture a collection of data at a first capture rate, during a sample collection period following the time interval;
    obtain a plurality of data of the collection of data captured at the first capture rate; and
    aggregate the obtained plurality of data into the second data point of the data set, wherein the resource utilization growth rate represents memory leaks including an unused subset of the memory resources allocated to the one or more services that have not been used within a threshold period.

3. The system of claim 2, wherein the capturing the collection of data at the first capture rate comprises capturing data points in the collection of data every minute, and wherein the first data point represents the plurality of data captured over ten minutes.

4. The system of claim 1, wherein the at least one processor is further configured to:
    apply a first order central gradient to the data set that has been collected during the sample collection period following the time interval, the angle being computed by drawing a line relative to an axis from the reference data point to the second data point.

5. The system of claim 1, wherein the at least one processor is further configured to:
    obtain a plurality of consecutive data samples during the sample collection period following the time interval; and
    compute a plurality of angles between the reference data point and the plurality of consecutive data samples relative to an axis, wherein the plurality of angles includes the angle.

6. The system of claim 5, wherein the at least one processor is further configured to:
    compare the plurality of angles to the threshold; and
    in response to determining that a majority of the plurality of angles exceeds the threshold,
        determine that the at least one resource utilization anomaly occurred; and
        trigger the anomaly detection operation.

7. The system of claim 5, wherein the at least one processor is further configured to:
    compare the plurality of angles to the threshold; and
    in response to determining that more than a threshold quantity of the plurality of angles exceeds the specified threshold,
        determine that the at least one resource utilization anomaly occurred; and
        trigger the anomaly detection operation.

8. The system of claim 5, wherein the plurality of consecutive data samples comprises ten consecutive data samples; and
    wherein each data sample of the plurality of consecutive data samples represents data aggregated over a ten minute interval.

9. The system of claim 1, wherein the data set represents memory utilization of one or more server query language (SQL) servers; and
    wherein the one or more SQL servers includes the server.

10. A method, comprising:
accessing, by one or more processors, a data object including a data set that has been collected over a time interval;
selecting, from the data set, a reference data point representing a first resource utilization of a server at a starting point of the time interval, wherein the first resource utilization includes memory resources allocated by the server to one or more services;
selecting a second data point from the data set, the second data point representing a second resource utilization of the server during a sample collection period following the time interval;
computing an angle representing a resource utilization growth rate between the reference data point and the second data point, wherein the resource utilization growth rate includes at least the first resource utilization corresponding to the reference data point and the second resource utilization corresponding to the second data point;
determining that the angle representing the resource utilization growth rate exceeds a threshold; and
in response to determining that the angle representing the resource utilization growth rate exceeds the threshold,
determining that at least one resource utilization anomaly occurred; and
triggering an anomaly detection operation comprising at least one of: (i) rebooting the server and (ii) reallocating resources of the server.

11. The method of claim 10, further comprising:
capturing a collection of data at a first capture rate, during the sample collection period following the time interval;
obtaining a plurality of data of the collection of data captured at the first capture rate; and
aggregating the obtained plurality of data into the second data point of the data set, wherein the resource utilization growth rate represents memory leaks including an unused subset of the memory resources allocated to the one or more services that have not been used within a threshold period.

12. The method of claim 10, further comprising:
applying a first order central gradient to the data set that has been collected during the sample collection period following the time interval, the angle being computed by drawing a line relative to an axis from the reference data point to the second data point.

13. The method of claim 10, further comprising:
obtaining a plurality of consecutive data samples during the sample collection period following the time interval; and
computing a plurality of angles between the reference data point and the plurality of consecutive data samples relative to an axis, wherein the plurality of angles includes the angle.

14. The method of claim 13, further comprising:
comparing each of the plurality of angles to the specified threshold; and
in response to determining that more than a threshold quantity of the plurality of angles exceeds the specified threshold,
determining that the at least one resource utilization anomaly occurred; and
triggering the anomaly detection operation.

15. The method of claim 10, further comprising:
assigning a plurality of different thresholds to each of a plurality of different servers; and
selecting the threshold from the plurality of different thresholds.

16. The method of claim 10, further comprising:
prior to triggering the anomaly detection operation,
determining that the angle is greater than the threshold by more than a reboot amount, indicating an initially high growth rate of data that stabilizes over time;
determining that a reboot of the server has occurred, based on the angle being greater than the threshold by more than the reboot amount; and
in response to determining that the reboot of the server has occurred,
preventing triggering the anomaly detection operation.

17. The method of claim 10, wherein triggering comprises:
transmitting a notification to an operator;
identifying the server on which the angle representing the resource utilization growth rate exceeds the threshold in the notification; and
providing an option to reboot the server in the notification.

18. A non-transitory, computer-readable medium having instructions thereon, wherein, when executed by a processor, perform a method comprising:
accessing, by the processor, a data object including a data set that has been collected over a time interval;
selecting, from the data set, a reference data point representing a first resource utilization of a server at a starting point of the time interval, wherein the first resource utilization includes memory resources allocated by the server to one or more services;
selecting a second data point from the data set, the second data point representing a second resource utilization of the server during a sample collection period following the time interval;
computing an angle representing a resource utilization growth rate between the reference data point and the second data point, wherein the resource utilization growth rate includes at least the first resource utilization corresponding to the reference data point and the second resource utilization corresponding to the second data point;
determining that the angle representing the resource utilization growth rate exceeds a threshold; and
in response to determining that the angle representing the resource utilization growth rate exceeds the threshold,
determining that at least one resource utilization anomaly occurred; and
triggering an anomaly detection operation comprising at least one of: (i) rebooting the server, (ii) reallocating resources of the server, and (iii) transmitting a notification to an operator.

19. The non-transitory, computer-readable medium of claim 18, wherein the method further comprises:
counting a number of times within a time period that the anomaly detection operation has been triggered; and
in response to determining that the counted number of times that the anomaly detection operation has been triggered exceeds a threshold value,
selectively discontinuing a process for determining that the angle representing the resource utilization growth rate exceeds the threshold.

20. The non-transitory, computer-readable medium of claim 18, wherein the method further comprises:
capturing a collection of data at a first capture rate, during the sample collection period following the time interval;

obtaining a plurality of data of the collection of data captured at the first capture rate; and aggregating the obtained plurality of data into the second data point of the data set, wherein the resource utilization growth rate represents memory leaks including an unused subset of the memory resources allocated to the one or more services that have not been used within a threshold period.

\* \* \* \* \*